(12) United States Patent
Chiang

(10) Patent No.: US 7,357,057 B2
(45) Date of Patent: Apr. 15, 2008

(54) PAPER CUTTER

(76) Inventor: Tung-Lung Chiang, No. 20, Min Sheng Rd., Tou Liu City, Yu Lin Hsien (TW)

( * ) Notice: Subject to any disclaimer, the term of this patent is extended or adjusted under 35 U.S.C. 154(b) by 127 days.

(21) Appl. No.: 11/326,405

(22) Filed: Jan. 6, 2006

(65) Prior Publication Data

US 2007/0157783 A1  Jul. 12, 2007

(51) Int. Cl.
*B26D 5/08* (2006.01)
*B23D 19/00* (2006.01)

(52) U.S. Cl. ............................. 83/614; 83/485; 83/955

(58) Field of Classification Search .................. 83/485, 83/614, 620, 455, 552, 955, 678; 30/125
See application file for complete search history.

(56) References Cited

U.S. PATENT DOCUMENTS

| | | | |
|---|---|---|---|
| 3,733,951 A * | 5/1973 | Fujimoto | 83/484 |
| 3,759,122 A * | 9/1973 | Lane et al. | 83/24 |
| 4,187,755 A * | 2/1980 | Shirai | 83/882 |
| 2005/0172774 A1* | 8/2005 | Tseng | 83/614 |
| 2006/0053994 A1* | 3/2006 | Carrill et al. | 83/485 |
| 2006/0117925 A9* | 6/2006 | Volfson et al. | 83/485 |
| 2006/0174741 A1* | 8/2006 | Chiang | 83/684 |
| 2007/0028738 A1* | 2/2007 | Chan | 83/485 |
| 2007/0125214 A1* | 6/2007 | Dong et al. | 83/485 |

* cited by examiner

*Primary Examiner*—Ehud Gartenberg
*Assistant Examiner*—Bharat C Patel
(74) *Attorney, Agent, or Firm*—Rosenberg, Klein & Lee

(57) ABSTRACT

A paper cutter includes a base with a rail secured thereon, a slide unit, a cutter seat and at least two blades. The base is provided with the rail for the slide unit to slide thereon. The cutter seat is pivotally connected to the slide unit. The cutter seat is provided with the blades. The slide unit further comprises a one-way locking member therein. The cutter seat comprises locking edges corresponding to the locking member for one-way engagement of the locking member with one of the locking edges. The cutter seat is positioned with respect to the slide unit. By turning the cutter seat towards a reversed direction, the blades are exchangeable. The one-way locking member is a pawl. The pawl is urged by an elastic member towards one-way direction to engage with the locking edge.

2 Claims, 7 Drawing Sheets

A-A

B-B

C-C

PAPER CUTTER

BACKGROUND OF THE INVENTION

1. Field of the Invention

This invention relates to a paper cutter, and more particularly to a paper cutter having multi-blades to provide various designs of cutting edges.

2. Background of the Prior Art

Paper cutters are widely used by consumers. As shown in FIGS. 5 through 7, a conventional paper cutter comprises a base 71 with a rail 72 for a slide unit 73 to slide thereon. A cutter seat 74 is pivotally connected to the slide unit 73 and is in parallel to the rail 72. The turning axis of the cutter seat 74 is vertical to the rail 72. The cutter seat 74 comprises at least two blades 75. The slide unit 73 comprises a knob 76 which links a tenon 77. The tenon 77 is constantly urged by an elastic element 78 to engage with the slide unit 73.

To replace blades 75, the knob 76 is pressed to disengage the tenon 77 from the slide unit 73, and then the knob 76 is turned to rotate the cutter seat 74 and to exchange one desired blade 75.

To cut paper, the tenon 77 will absorb the counterforce from the blades 75, therefore the tenon 77 is easy to be worn, which affects the accuracy of positioning the blades 75.

SUMMARY OF THE INVENTION

It is the primary object of the present invention to provide a paper cutter, which is easy to operate and to exchange blades.

It is another object of the present invention to provide a paper cutter, which has a longer lifespan.

It is a further object of the present invention to provide a paper cutter, which provides more attractive cutting edges.

According to an aspect of the invention, there is provided a paper cutter comprising a base, a rail, a slide unit, a cutter seat and at least two blades, said base being provided with said rail for said slide unit to slide thereon, said cutter seat being pivotally connected to said slide unit, said cutter seat being provided with said blades, said cutter seat rotating round said rail, said slide unit comprising a one-way locking member, said cutter seat comprising locking edges corresponding to said locking member for one-way engagement of said locking member with one of said locking edges, said cutter seat being positioned with respect to said slide unit, by turning said cutter seat towards a reversed direction, said blades being exchangeable;

said one-way locking member being a pawl, said pawl being urged by an elastic element towards one-way direction against one of said locking edges, by turning said cutter seat towards a reversed direction, said pawl being detached from said locking edge.

DETAILED DESCRIPTION OF THE PREFERRED EMBODIMENT

Figure 1:
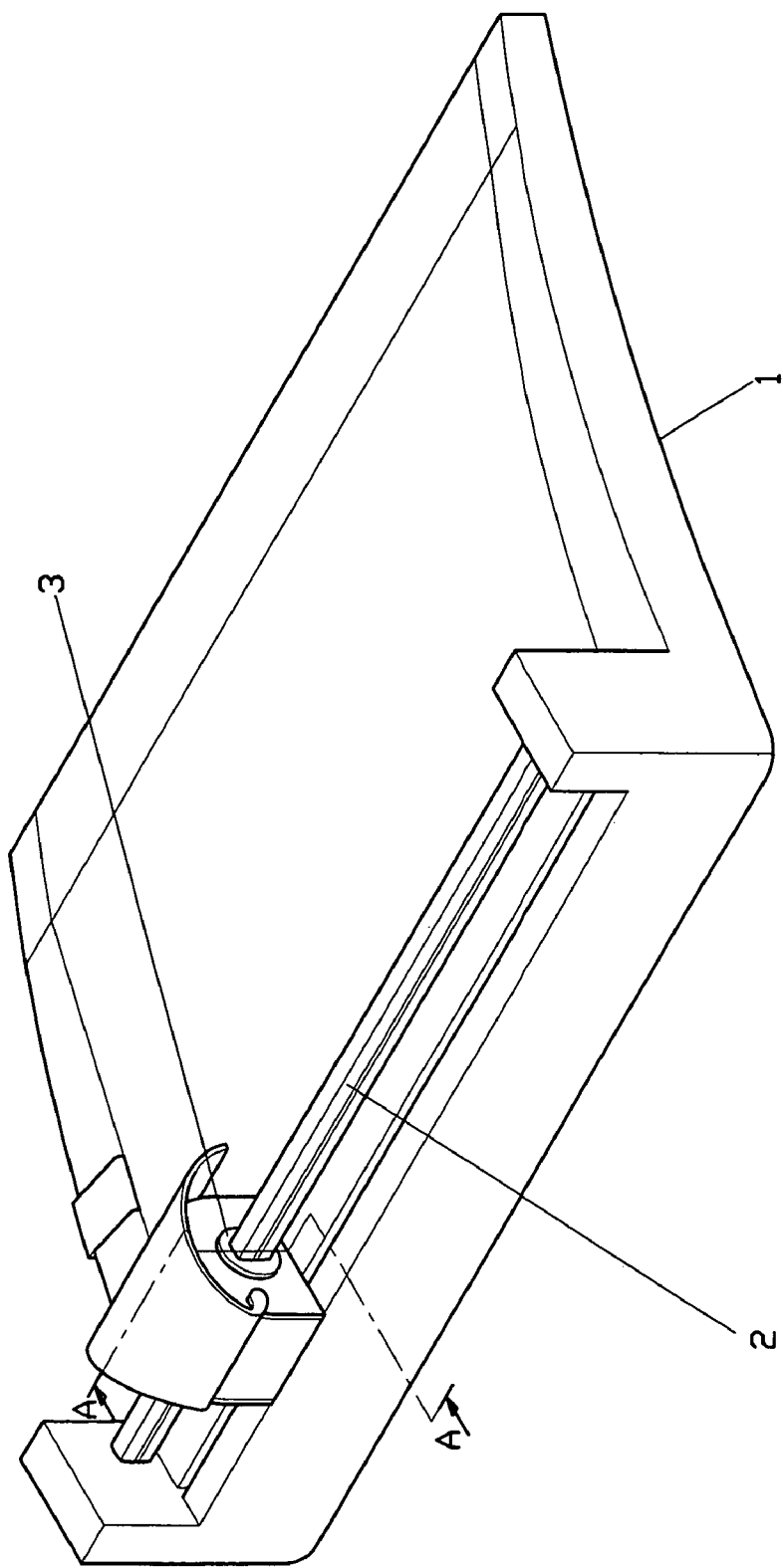
FIG. 1 is a perspective view of the present invention.
Figure 2:
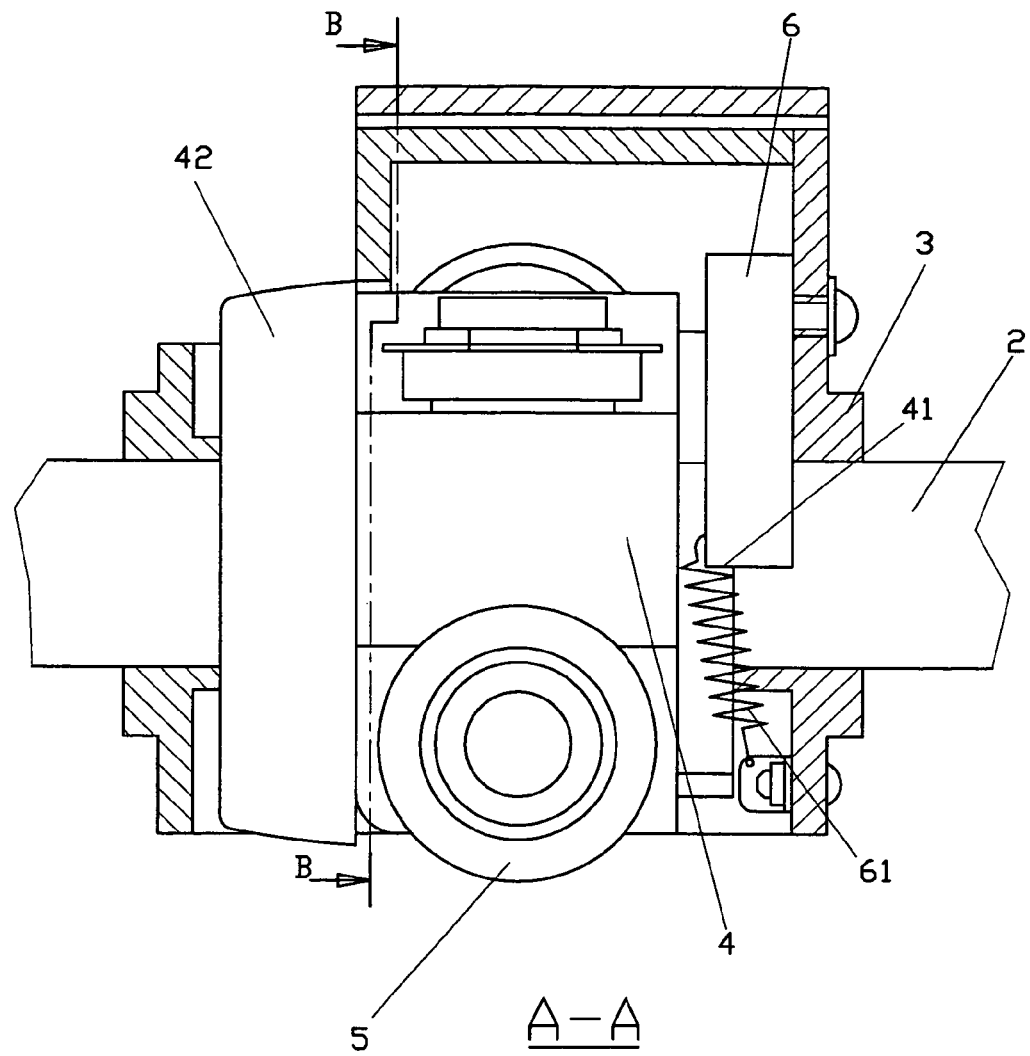
FIG. 2 is a cross-sectional view taken along line A-A of FIG. 1.
Figure 3:
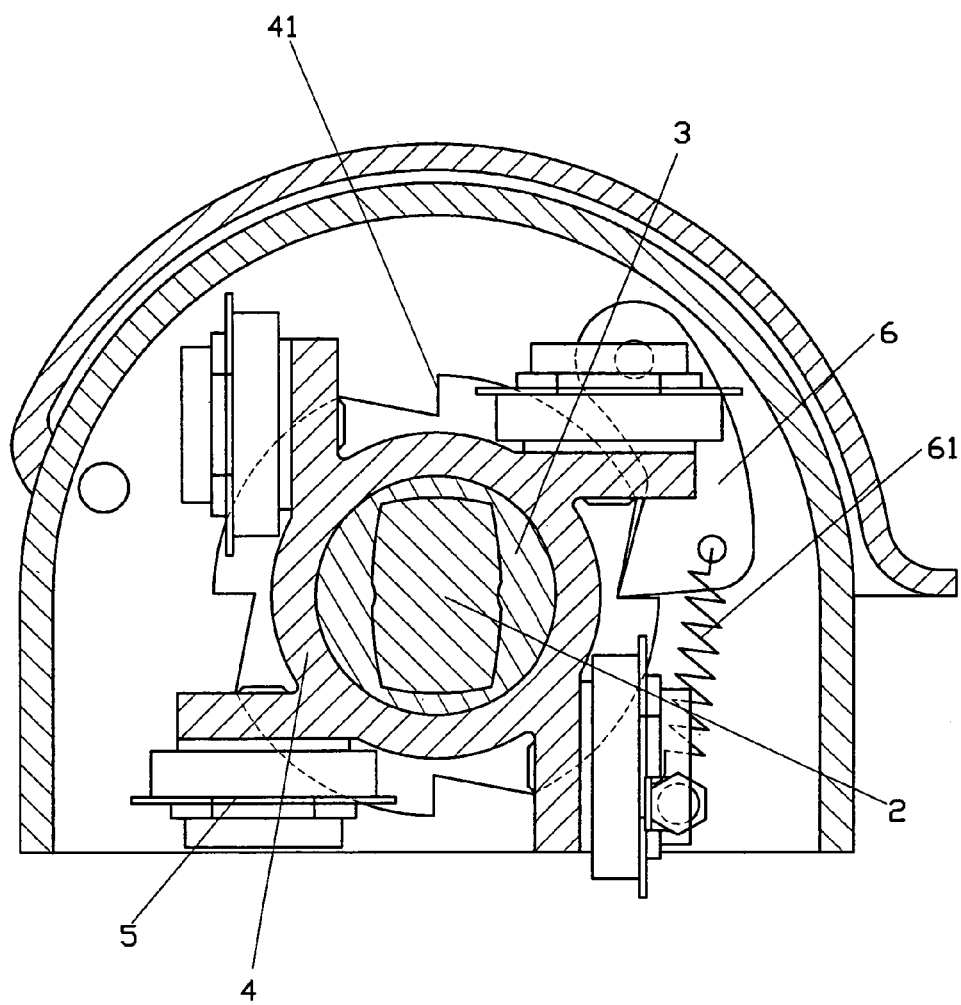
FIG. 3 is a cross-sectional view taken along line B-B of FIG. 2.

As shown in FIGS. 1 through 3, a preferred embodiment of the present invention comprises a base 1, a rail 2, a slide unit 3, a cutter seat 4 and at least two blades 5. The base 1 is provided with the rail 2 for the slide unit 3 to slide thereon. The cutter seat 4 is pivotally connected to the slide unit 3 and spins round the rail 2. The blades 5 are provided on the cutter seat 4. The slide unit 3 has a one-way locking member. In the preferred embodiment, the one-way locking member is a pawl 6. The cuter seat 4 comprises locking edges 41 corresponding to the pawl 6. A knob 42 is provided on the cutter seat 4. The pawl 6 is urged by an elastic element 61 to engage with the locking edge 41 in normal status.

Figure 4:
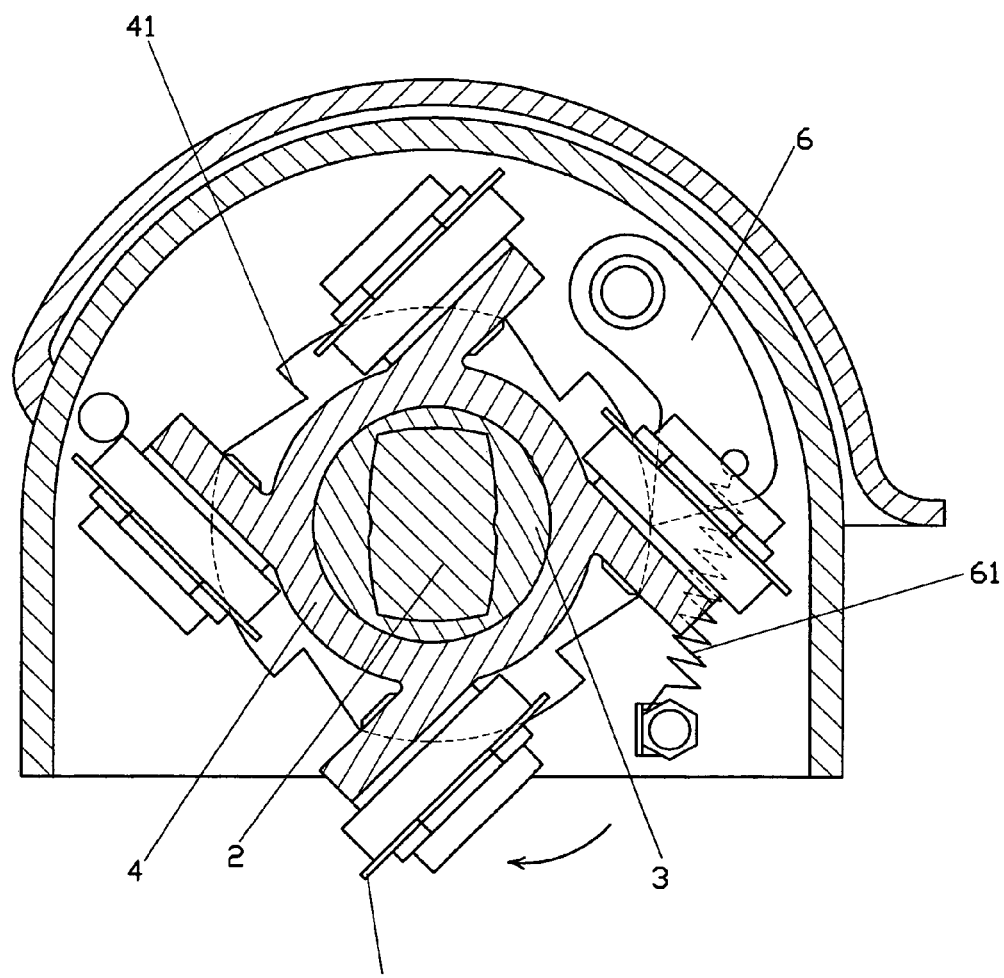
FIG. 4 is a cross-sectional view of the present invention in an operating status.
Figure 5:
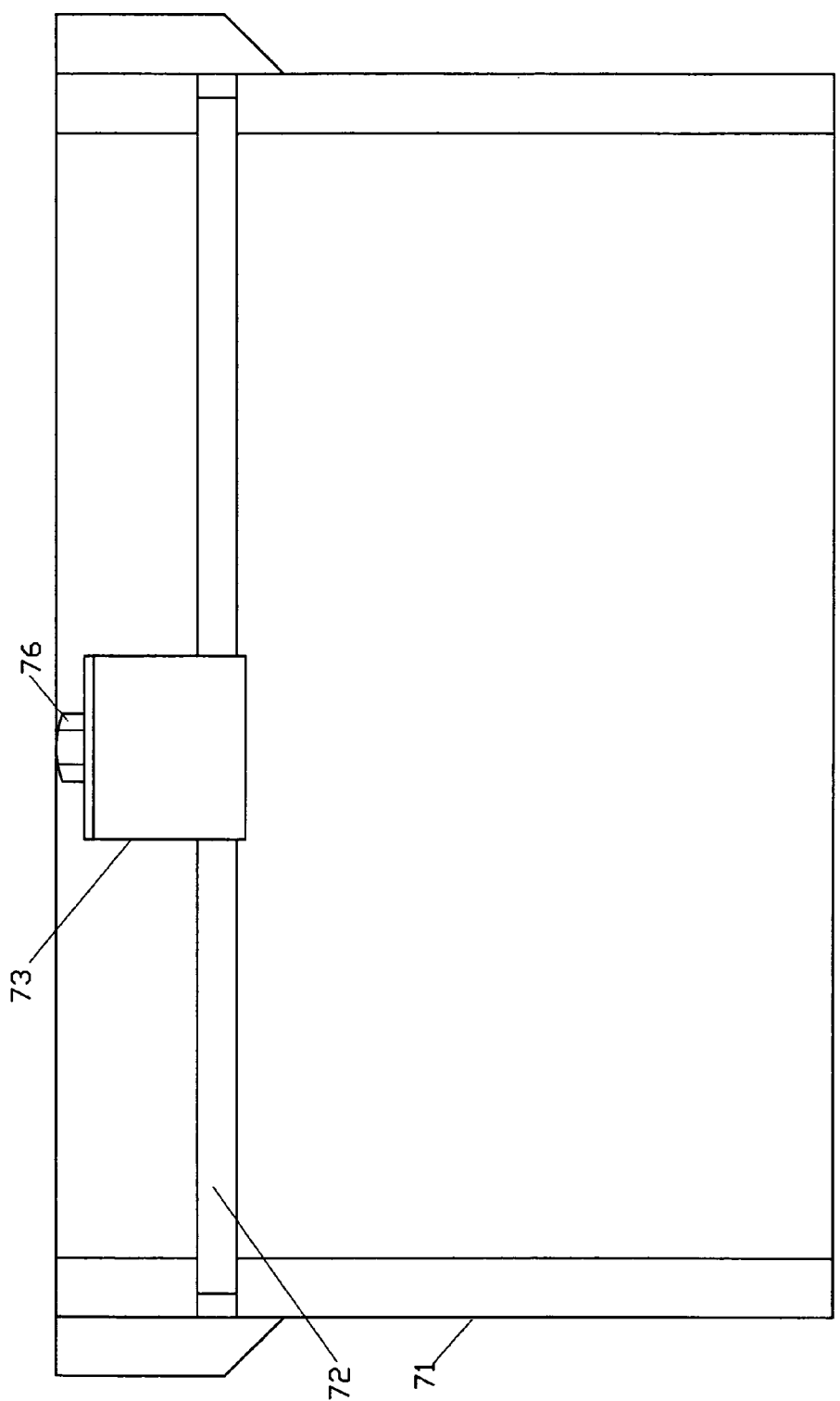
FIG. 5 is a top view of a paper cutter of the prior art.
Figure 6:
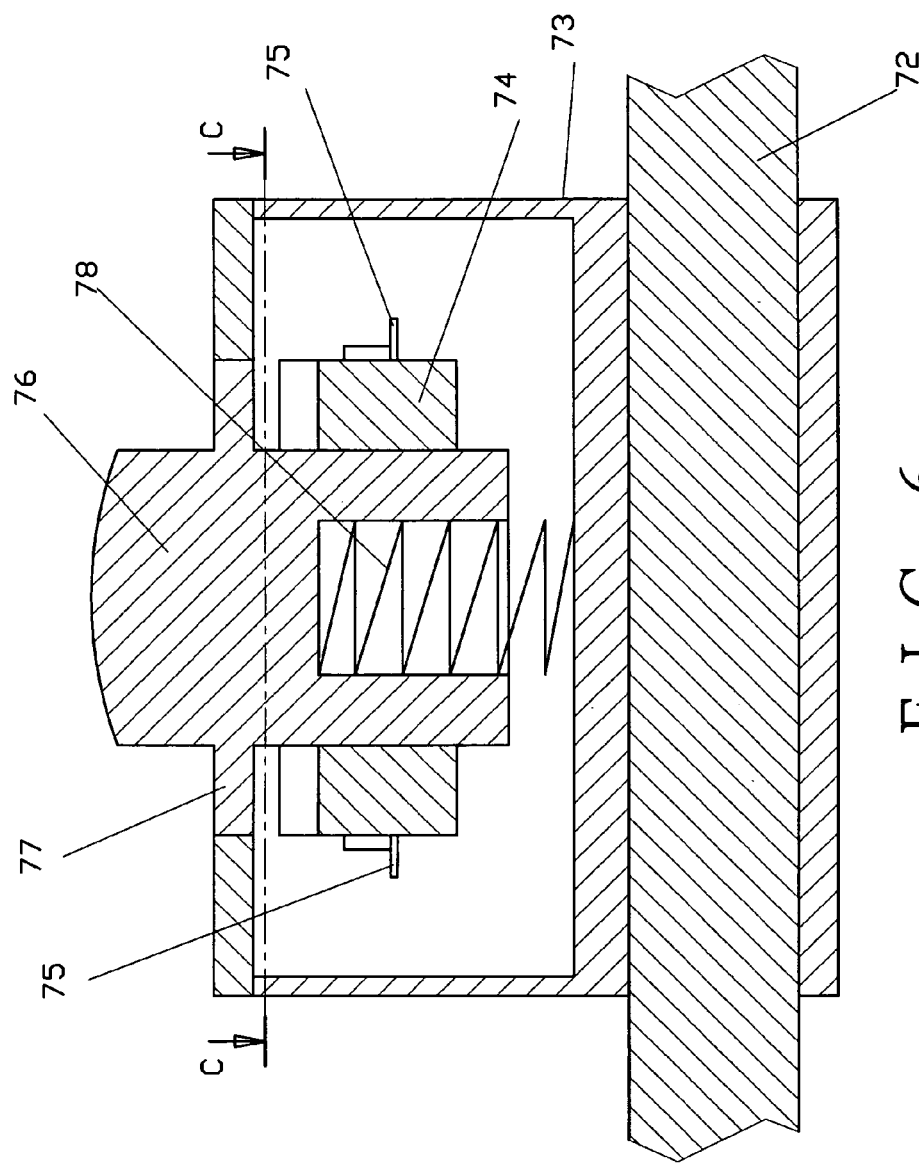
FIG. 6 is an enlarged cross-sectional view of FIG. 5.
Figure 7:
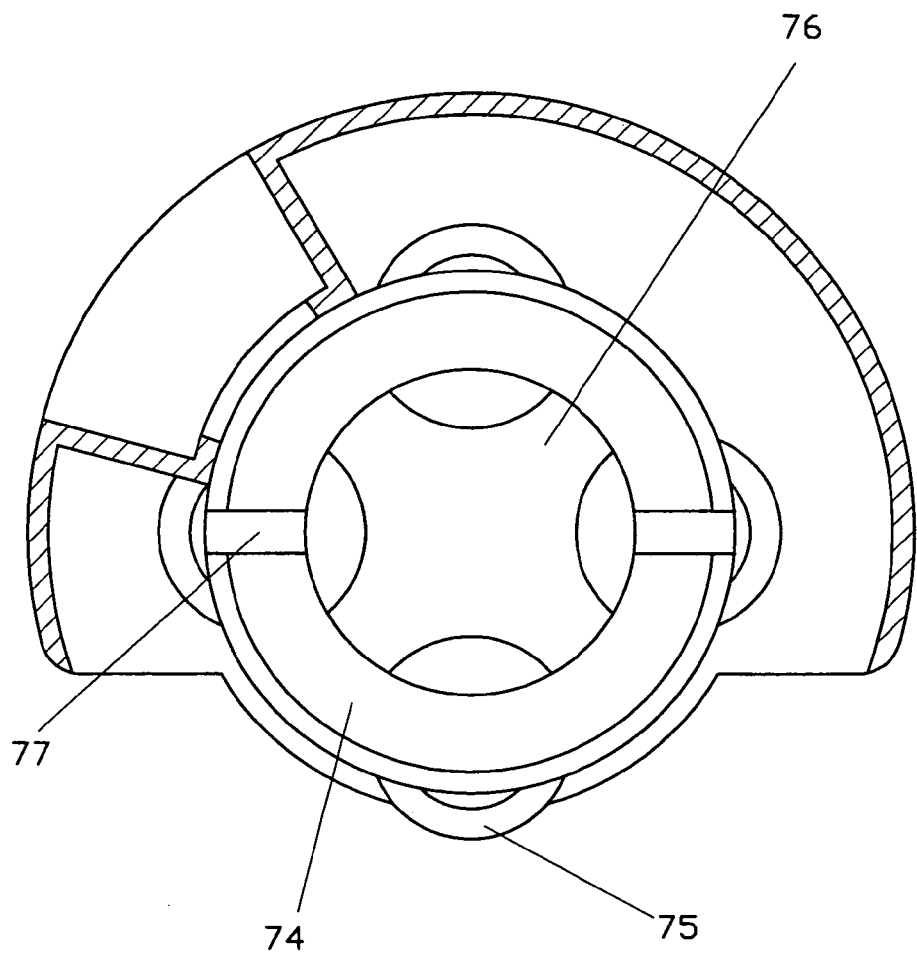
FIG. 7 is a cross-sectional view taken along line C-C of FIG. 6.

In normal status, as shown in FIGS. 2 and 3, the pawl 6 engages with one relative locking edge 41. The cutter seat 4 is engaged by the pawl 6 and is secured with respect to the slide unit 3. The slide unit 3 is operated to slide and one relative blade 5 is ready to cut paper. While cutting paper, the counterforce of the blade 5 assists the locking edge 41 of the cutter seat 4 in engaging with the pawl 6. During the operation, the blade 5 is extremely stable. As shown in FIG. 4, by turning the knob 42 towards a reversed direction, (In the FIG. 4, it shows a clockwise direction.) the cutter seat 4 is rotated to detach the pawl 6 from the locking edge 41. Thus the cutter seat 4 is able to rotate with respect to the slide unit 3 to change the position of the blade 5 as well as to replace another desired blade 5. During the replacement, the blades 5 are rotated round the rail 2. The distance between two abutted blades 5 is shorter, which is convenient to the operator.

I claim:

1. A paper cutter comprising a base, a rail, a slide unit, a cutter seat and at least two blades, said base being provided with said rail for said slide unit to slide thereon, said cutter seat being rotatably coupled to said slide unit, said cutter seat being provided with said blades, and characterized by:

said cutter seat rotating around said rail and said slide unit comprising a one-way locking member, said cutter seat having ratchet teeth formed on a periphery thereof defining a plurality of locking edges for engagement with said locking member for one-way engagement of said locking member with one of said locking edges, said cutter seat being positioned with respect to said slide unit whereby turning said cutter seat rotationally in a first direction, permits said blades to be displaced to an exchangeable, and the plane including the rotational axes of said blades is perpendicular to said rail axis position; and, a biasing element coupling said one-way locking member to said slide unit for providing an engagement force between said one way locking unit and one of said locking edges to prevent rotation of said cutter seat in a second direction rotationally opposite to said first direction.

2. The paper cutter, as recited in claim 1, wherein said one-way locking member is a pawl, said pawl being urged by an elastic element towards one-way direction against one of said locking edges, by turning said cutter seat towards a reversed direction, said pawl being detached from said locking edge.

* * * * *